US008608185B2

(12) United States Patent
Bermal

(10) Patent No.: US 8,608,185 B2
(45) Date of Patent: Dec. 17, 2013

(54) SKATEBOARD TRUCK

(75) Inventor: Jay Velitario Bermal, San Diego, CA (US)

(73) Assignee: Reincarnate, Inc., San Diego, CA (US)

( * ) Notice: Subject to any disclaimer, the term of this patent is extended or adjusted under 35 U.S.C. 154(b) by 42 days.

(21) Appl. No.: 13/467,046

(22) Filed: May 9, 2012

(65) Prior Publication Data

US 2013/0175777 A1   Jul. 11, 2013

Related U.S. Application Data

(60) Provisional application No. 61/583,780, filed on Jan. 6, 2012.

(51) Int. Cl.
B62M 1/00 (2010.01)

(52) U.S. Cl.
USPC ........................................ 280/87.042

(58) Field of Classification Search
USPC .............................. 280/87.1–87.042
See application file for complete search history.

(56) References Cited

U.S. PATENT DOCUMENTS

| | | | | |
|---|---|---|---|---|
| 5,947,493 A * | 9/1999 | Pasin et al. | ............. | 280/47.34 |
| 6,341,790 B1 * | 1/2002 | Chen | ............. | 280/87.041 |
| 6,382,646 B1 * | 5/2002 | Shaw | ............. | 280/87.041 |
| 6,398,238 B1 * | 6/2002 | Shaw | ............. | 280/87.042 |
| 6,793,224 B2 * | 9/2004 | Stratton | ............. | 280/87.042 |
| 6,981,710 B2 * | 1/2006 | Cheng | ............. | 280/87.03 |
| 7,717,200 B2 * | 5/2010 | Kakinuma et al. | ............. | 180/6.5 |
| 8,047,556 B2 * | 11/2011 | Jang et al. | ............. | 280/87.042 |
| 2002/0089130 A1 * | 7/2002 | Cassel | ............. | 280/11.27 |
| 2002/0096846 A1 * | 7/2002 | Chen | ............. | 280/87.041 |
| 2002/0121757 A1 * | 9/2002 | Louh | ............. | 280/87.041 |
| 2002/0149165 A1 * | 10/2002 | Lin | ............. | 280/87.041 |
| 2002/0167143 A1 * | 11/2002 | Shaw | ............. | 280/87.041 |
| 2002/0167144 A1 * | 11/2002 | Guang-Gwo | ............. | 280/87.041 |
| 2002/0180169 A1 * | 12/2002 | Kwok | ............. | 280/87.041 |
| 2003/0057670 A1 * | 3/2003 | Tuan | ............. | 280/87.041 |
| 2004/0032105 A1 * | 2/2004 | Tsai | ............. | 280/87.041 |
| 2006/0145443 A1 * | 7/2006 | Morris | ............. | 280/87.01 |
| 2013/0175775 A1 * | 7/2013 | Bermal | ............. | 280/81.5 |
| 2013/0175777 A1 * | 7/2013 | Bermal | ............. | 280/87.042 |

* cited by examiner

Primary Examiner — Jeffrey J Restifo
Assistant Examiner — Erez Gurari
(74) Attorney, Agent, or Firm — Eric A. Hanscom; Todd J. Langford

(57) ABSTRACT

A skateboard truck assembly with an integrated combination of a system of gears that resemble planetary gears that allow both wheels and a caster to remain on the ground while the skateboard is traveling in a lengthwise manner. At the same time, when the rider leans to one side or the other of the skateboard, the gear assembly causes the "downhill" wheel to rise in the air and the caster to be displaced such that the skateboarder can laterally "slide" or "drift" the skateboard as though it was a snowboard. Because the downhill wheel is raised well above the ground, there is less of a tendency for the downhill wheel to catch on any street irregularities or rocks and stop sliding at inopportune times.

22 Claims, 7 Drawing Sheets

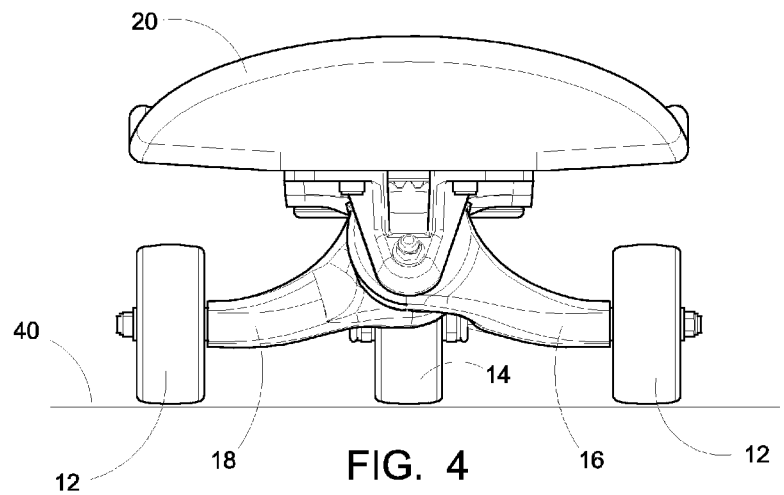
FIG. 4
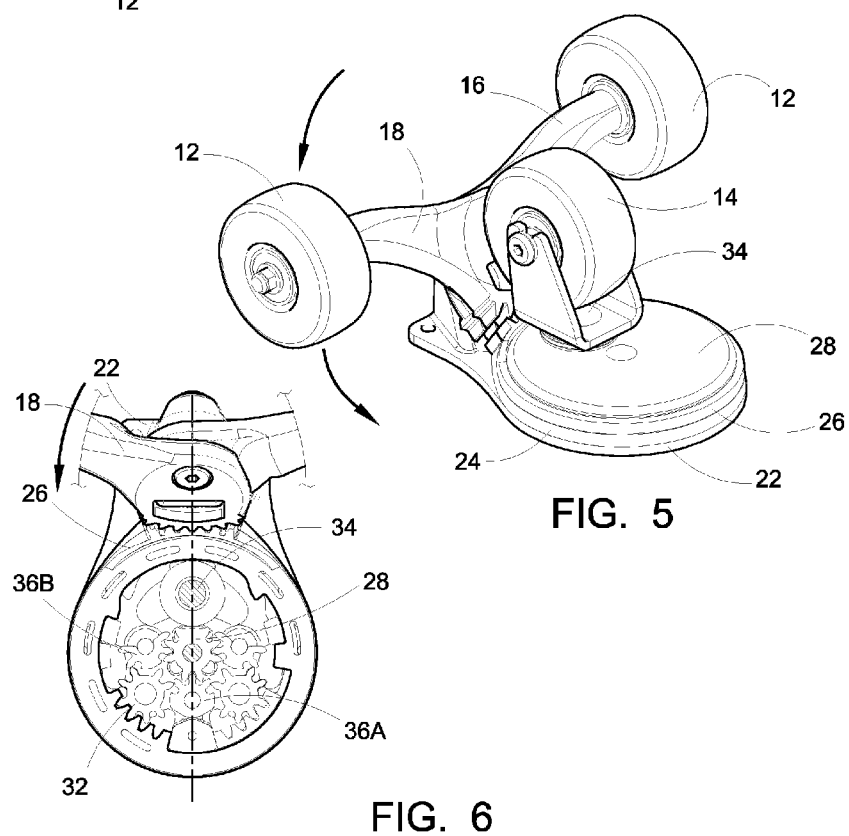
FIG. 5
FIG. 6

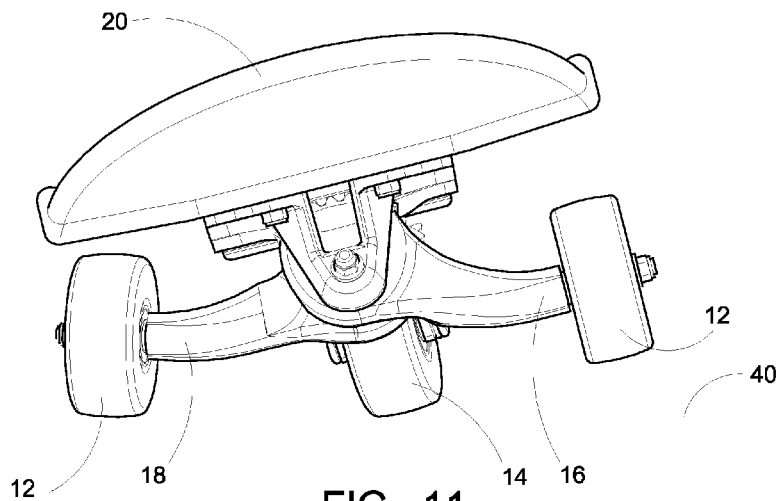
FIG. 11
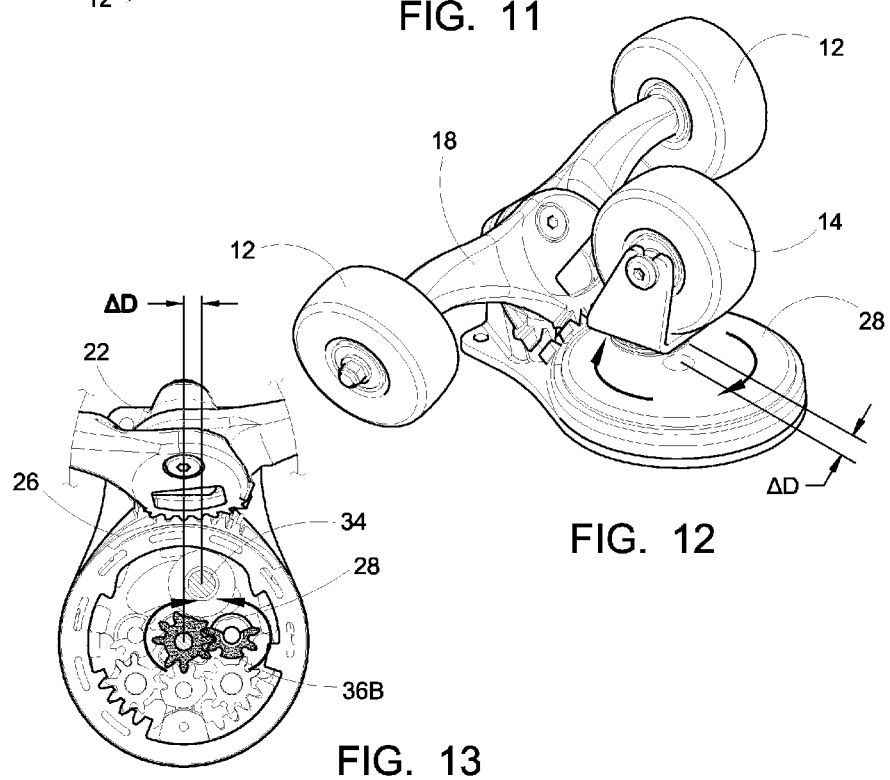
FIG. 12
FIG. 13

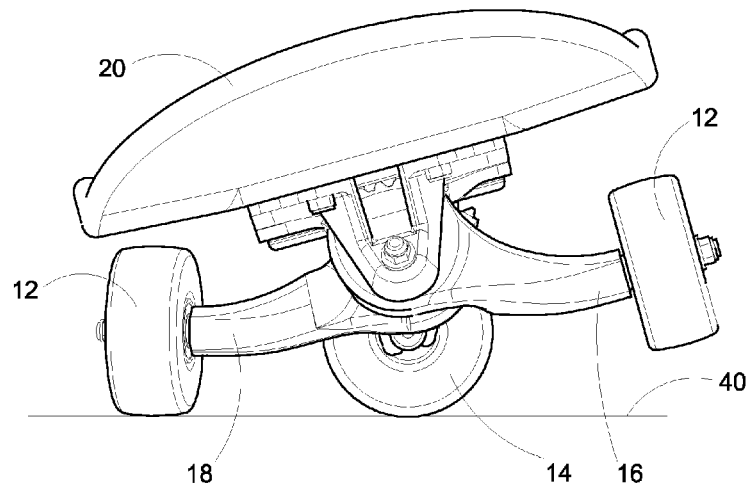
FIG. 14
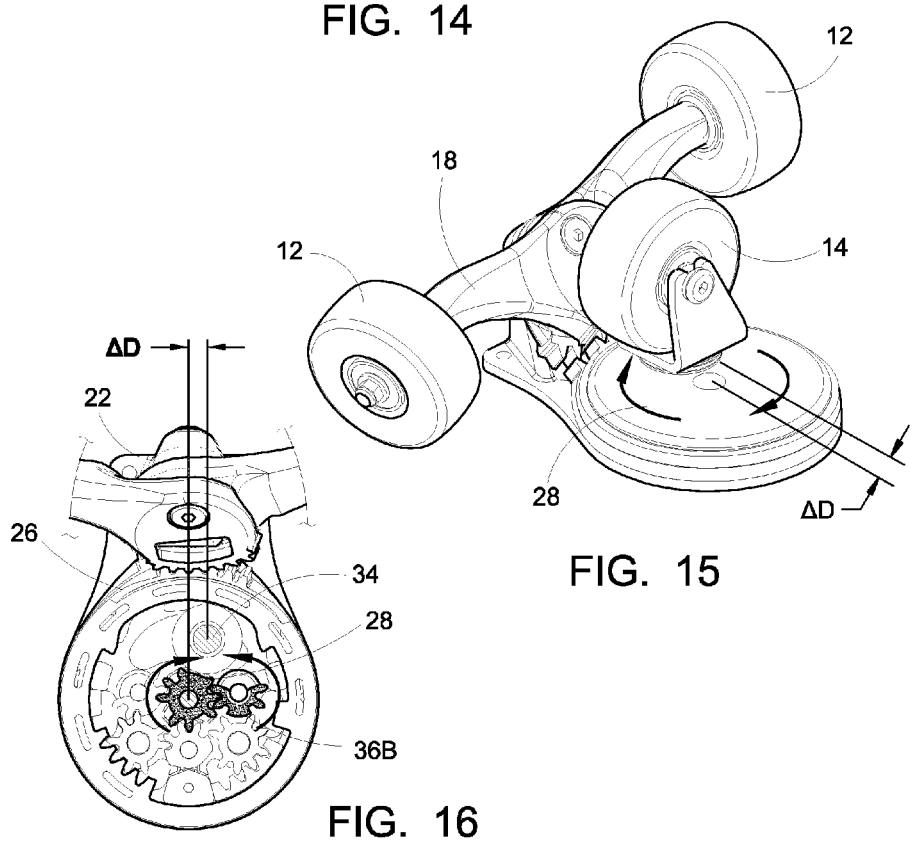
FIG. 15
FIG. 16

SKATEBOARD TRUCK

CROSS REFERENCE TO RELATED APPLICATIONS

This application claims the benefit of U.S. Provisional Patent Application No. 61/583,780 filed on Jan. 6, 2012, the entirety of which is hereby incorporated by reference.

STATEMENT REGARDING FEDERALLY SPONSORED RESEARCH OR DEVELOPMENT

This invention was not federally sponsored.

BACKGROUND OF THE INVENTION

Field of the Invention

This invention relates to the general field of sporting equipment, and more specifically toward a skateboard truck assembly with an integrated combination of a system of gears that resemble planetary gears and a split hanger system that allow both wheels and a caster to remain on the ground while the skateboard is traveling in a lengthwise manner. At the same time, when the rider leans to one side or the other of the skateboard, the gear assembly and split hanger system causes the "downhill" wheel to rise in the air and the caster to be displaced such that the skateboarder can laterally "slide" or "drift" the skateboard as though it was a snowboard. Because the downhill wheel is raised well above the ground, there is less of a tendency for the downhill wheel to catch on any street irregularities or rocks and stop sliding at inopportune times.

With two such skateboard trucks on each skateboard, the rider can have a total of six wheels on the ground simultaneously while skating in a straight line, but when the rider is making turns or "drifts" or "slides" the skateboard sideways, the "downhill" wheel lifts up, thereby giving the rider more clearance to avoid catching the downhill wheel on any irregularities in the street or other surface upon which he/she is skateboarding. Essentially, the invention provides a split hanger and a displacement of the caster, or center wheel, from the centerline of the skateboard, which results in enhanced pleasure, maneuverability, stability, and safety in the skateboarding experience for skateboarders who are interested in speed control and sliding or drifting their skateboards sideways.

In action, all six wheels are on the ground only when the skateboard truck is in the neutral position, or in other words, while the skateboard is traveling in a straight-line along the centerline of the skateboard, such as in a forward or reverse direction. When the rider leans to one side of the skateboard in order to make a turn, the two wheels on the opposite edge of the skateboard lifts off of the ground, leaving only four wheels on the ground. Likewise, when the rider maneuvers the board such that the skateboard travels in a lateral direction in order to control the speed, the two wheels on the opposite edge of the skateboard lifts off of the ground, leaving only four wheels on the ground. This leaves the "uphill" wheels and the caster wheels on the ground as the "downhill" wheels lifts off of the ground. This way, a minimum of four wheels remain on the ground at all times, providing stability, where two of those wheels are casters that have rotated in a position 90 degrees off the center line of the skateboard, thereby making it easier to laterally move the skateboard.

The terms epicyclic gears or planetary gears are intended to mean a system of gears that include at least a planet gear, ring gear or annulus, sun gear, and planet carrier. The configuration of the present invention includes a modified planetary gearing system that includes an additional ring gear and another gear that revolves around the sun gear. The latter of the aforementioned gears is termed the moon gear, as its function is different than a planet gear. It is also envisioned that a combination of other types of mechanisms can be used, but modified planetary gears are incorporated for the sole purpose of the displacement of the caster wheel.

Turning to the industry in which this invention is practiced, an understanding of the history of the sport as well as its evolutionary path is important to comprehend the importance of this invention.

The sport of skateboarding can trace its root to the 1940's, although it became a popular sport beginning in the 1960's as an offshoot of surfing. Because skateboards can be used anywhere there are hard surfaces, such as streets and sidewalks, and are not limited to coastal areas with decent surf, it has eclipsed the popularity of surfing many times over both in terms of numbers of participants and size of the industry. As would be expected with such a developed sport, skateboards and their components have evolved over four decades or so since the first person took the wheels off an old pair of roller skates and put them on the underside of a 2"×4" piece of wood.

The modern skateboard comprises several basic components, including a riding surface, or deck, usually made of an elongated piece of wood, fiberglass or some other sturdy, resilient and flexible material, four wheels with some sort of ball bearing arrangement upon which the deck and rider are transported, and two skateboard trucks, where the trucks are the steering mechanisms or devices by which the wheels are connected to the deck. The trucks are attached to the deck in a mirror image manner, such that as a user leans on one side of the skateboard, the forces applied by the user cause each truck to simultaneously steer in the opposite direction that the other truck steers. While located in a fairly unobtrusive location on the underside of the deck, the trucks are very important as they determine how the skater controls his/her skateboard by determining how a skateboard's wheels turn. A person doubting the importance of the trucks merely needs to try a quick straight-line trip down a winding hill on a skateboard with trucks that do not allow the skateboard wheels to turn before realizing the folly of such an opinion.

Skateboard trucks are made in a wide variety of styles which rely upon several basic components, within which there can be significant variation. The basic components of the modern skateboard truck include a base plate or a truck mounting plate, which is a molded piece of metal with at least four holes along its edges, which is used to screw or bolt the truck to the bottom of the deck, a bolt, which attaches the wheel-mounting axle to the base plate, and an upward-projecting, wheel-mounting axle which suspends the skateboard wheels on either side of the kingpin and has a single truck axle or kingpin which sits in a protected cup or pin-receiving hole in the base plate. The turning ability of the skateboard depends on the design and adjustments made to the kingpin, as the wheels of the skateboard traditionally pivot around or in close proximity to the kingpin. The bolt is generally threaded through an oversized hole lined with compressible and resilient bushings, often made of plastic components such as urethane, whereby tightening the bolt makes it more difficult to flex the axle, and therefore more difficult to turn the skateboard (tightening the bolt also generally tends to make the skateboard more stable and less susceptible to "wobble" at high speeds, so there is an inherent trade-off between a user's desire for skateboard maneuverability and stability at high speeds).

As the user leans from side to side, the bolt presses against the bushings, enabling turning and at the same time compressing the bushings, such that further leaning becomes more and more difficult for the user. The skateboard user steers the skateboard by leaning from one side to another, thereby applying pressure to the truck, such that the truck pivots around the truck axles whereby on the front wheels, the outer wheel moves forward while the inside wheel moves back, and on the rear wheels, the outer wheel moves back and the inner wheel moves forward, thereby causing the two sets of wheels to no longer be in alignment but rather to describe an arc through which the skateboard will now travel, presuming the rider balances successfully on the skateboard.

As with many action sports, skateboarders are always looking for ways to improve upon their equipment by borrowing technologies or ideas from other sports. Having its origin in surfing (indeed, skateboarding initially was nicknamed "sidewalk surfing"), skateboarding borrowed heavily from surfing in its early days.

Another sport to borrow from surfing was snowboarding, which was initially developed as a way to blend surfing and skiing. Skateboarders appreciated the lateral movement possible in snowboarding and skiing and began to try to obtain similar movement on their skateboards. For those not experienced with snowboarding, by leaning on the uphill rail, it is possible to slide the tail of the snowboard forward. By eventually shifting the weight to the formerly outside rail, a snowboarder can bring the snowboard around in a complete 360 degree turn. By carefully balancing his or her weight on the front and back feet, and leaning on the uphill side of the snowboard, a snowboarder can also bring the snowboard to a stop, using a braking technique similar to that employed by an ice skater doing a "hockey stop".

Snowboarding, began sometime in the mid 1960's as an offshoot to skiing. The snowboarding and skateboarding industries are very similar, such that there have been many attempts to create or improve sporting goods in their respective industries by creating or redesigning these sporting goods to include some features prevalent and useful in one industry into the other. In the skateboarding industry, there have been many attempts to redesign a skateboard configuration to include some of the features prevalent in snowboarding, one of which include the lateral motion for increased maneuverability and speed control, as well as provide for the performance of tricks, such as the 360 degree spin without the snowboard leaving the snow.

Because a traditional skateboard has four wheels, all aligned in parallel without the capacity to swivel, skateboarders mainly directed their boards by leaning them from one side to the other. Eventually, skateboard wheel technology (and skateboarding ability) advanced to the point where skaters could temporarily slide their skateboards laterally, then recover from the slide and redirect their skateboards in a forward direction. However, this method was not an ideal solution to the desire to blend snowboarding with skateboarding, as it was fairly precarious trying to control a slide or drift by leaning more heavily on the inside or outside rail of the skateboard, and the wheels would wear unevenly, creating a bumpy ride in the future.

The late 1990's and early 2000's brought considerable advances to the blending of snowboard and skateboard technology. One such product was the lateral sliding rolling board, which was a skateboard with one or more casters on each truck, thereby allowing for lateral sliding. While these boards were an alternative to the traditional skateboard and allowed improved "drifting" or "sliding", the truck was a heavy, unarticulated, solid piece of metal, with one or more casters placed on the center side of the truck, with the outer wheels mounted on the same hanger and one or more casters placed on the center side of the truck. Thus, when a rider wanted to slide the board, the wheels on the uphill edge of the board would rotate closer to the deck at the same angle as the wheels on the downhill edge of the board would rotate closer to the ground. The precariousness of this arrangement limits the distance the downhill wheels leave the ground, making it dangerous for riders as they can "catch an edge", where the downhill wheels engage the ground, stopping the skateboard, thus throwing the rider from the skateboard. This is similar to a snowboarder catching an edge.

Thus, when a rider wanted to slide the board, once the rider overcame the initial inertia and forced the wheels to turn enough to lift the downhill wheel off the ground, and forced the caster to turn in the direction of the "drift" or "slide", the caster and only one wheel remained on the ground with the other wheel dangerously close to the ground, such that a minor irregularity in the surface of street could "catch" the downhill wheel and send the skateboarder flying off the skateboard. The precariousness of this arrangement can be seen not only in movies of riders on these types of boards, delicately trying to balance a slide with two of the six wheels on the skateboard only a few millimeters above the rough ground, but also in the fact that most of these boards are sold with skyhooks, which are bindings that enhance stability by keeping the rider's feet attached to the skateboard.

Additionally, the bias castor developed in the lateral sliding roller board creates a limiting force or moment that the rider must overcome in order to rotate the board laterally. This limitation is not prevalent in snowboards and disrupts the ease of movement for the rider. To compensate for this, riders traditionally use their arms to throw the rider's weight around. This can also be seen in the movies of riders on these types of boards. As mentioned previously, some riders of such skateboards resorted to modified skateboard bindings known as "skyhooks". While these devices successfully anchor the skateboarder's fee to the skateboard, skyhooks limit foot placement, which limits tricks that can be performed on a typical skateboard.

Another attempt to create a marriage between snow sports and skateboarding was the wheeled ski or land ski. These skis range from a basic roller skate or rollerblade with an elongated base with six or more wheels, to more complex devices with treads that rotate around a series of wheels. Land skis have never really caught on for the simple reason that they do not perform as well as their snow ski cousins do. Without the "give" of snow, a land skier is hard pressed to control a slide or drift unless the dirt upon which he or she is riding is of consistent, soft texture.

Thus there has existed a long-felt need for a skateboard truck that allows for smooth, controlled slides, drifts and stops by allowing for the uphill wheels and the caster of a truck to remain on the ground at the same time, with the downhill wheels being lifted off the ground to a height sufficient to avoid surface irregularities that could otherwise result in catching the downhill wheel. It must have a mechanism by which the angle of each axle for each wheel can change depending on the angle of the board.

SUMMARY OF THE INVENTION

The current invention provides just such a solution by having a skateboard truck with articulated, geared, individual axles for each wheel and caster allowing skating with all six wheels on the ground simultaneously and lateral sliding with the two uphill wheels and the two casters on the ground, and an adequate elevation of the downhill wheel such that catching a rail is minimized. Further enhancing the stability of this invention is the fact that the gearing is designed to offset the caster from the centerline when the rider leans to one side or the other.

It is a principal object of the invention to provide a skateboard truck that allows for lateral sliding in a stable and controllable manner.

It is another object of the invention to provide a skateboard truck with two separate axles, one for each wheel, such that the position of one can be raised relative to the ground.

It is a further object of the invention to provide a skateboard truck that has two separate axles that are connected by a series of gears to a caster such that the movement of one axle affects the position of the castor, but not the second axle.

It is an additional object of the invention to provide a skateboard truck with two separate axles and a caster, where both separate axles and the caster are interconnected by a series of gears such that a change in position of either axle of the caster will affect a change in the caster of the truck.

It is yet another object of the invention to provide a skateboard truck with two separate axles and a caster, where both separate axles and the caster are interconnected by a series of gears such that a change in position of either axle will affect a change in the other two parts of the truck.

It is a further object of the invention to provide a caster, caster bracket and caster plate that allow the castor to swivel with no restrictions, just like any other castor, but where the second swivel axis (the axis that is shared by the sun gear), baseplate, and both ring gears, cannot rotate without any influence from either of the two hangers; in other words, the configuration of the planet gears lock the sun gear in place.

An additional object of the invention includes providing a skateboard truck where all six wheels engage the ground in a neutral state, and when weight is applied to either side of skateboard, four wheels remain engaged to the ground.

It is another object of the invention to provide a skateboard truck where the middle wheels are coincident with the centerline of the skateboard in its neutral state, and where the middle wheel is offset when influenced by one of either hangers.

It is a final object of this invention to provide a skateboard truck that is made from few parts such that assembly of the truck is simple and manufacture of the truck is inexpensive.

In a particular embodiment, the current invention provides a skateboard comprising two skateboard trucks, where each skateboard truck comprises a hanger system, a caster, and a gearing system, where the hanger system comprises a top hanger, a bottom hanger, a king pin, and two wheels, where the top hanger and bottom hanger rotate about the king pin, where one wheel is secured to the top hanger, where one wheel is secured to the bottom hanger, where the gearing system comprises a plurality of gears, where the caster comprises a caster wheel and a caster bracket, where the caster bracket, top hanger, and bottom hanger are each secured to one of the plurality of gears of the gearing system, and whereby angular displacement of the top hanger about the king pin causes a displacement of the caster and angular displacement of the bottom hanger about the king pin causes a displacement of the caster.

In another embodiment, the current invention provides a skateboard truck comprising a hanger system, a caster, and a gearing system, where the hanger system comprises a top hanger, a bottom hanger, and a king pin, where the top hanger and bottom hanger rotate about the king pin, where the gearing system comprises a plurality of gears, where the caster comprises a caster wheel and a caster bracket, where the hanger system is in mechanical connection with the caster through the gearing system, whereby angular displacement of the top hanger about the king pin causes a displacement of the caster and angular displacement of the bottom hanger about the king pin causes a displacement of the caster.

In an additional embodiment, the current invention provides a skateboard truck comprising a hanger system, a caster, and a gearing system, where the skateboard has a centerline that runs down its length, where the hanger system comprises a top hanger, a bottom hanger, a king pin, and two wheels, where the top hanger and bottom hanger rotate about the king pin, where the top hanger and bottom hanger each comprise a toothed portion, where one wheel is secured to the top hanger, where one wheel is secured to the bottom hanger, where the gearing system comprises a top ring gear, a bottom ring gear, a sun gear, a plurality of planet gears, and a plurality of moon gears, where the top ring gear mates with one of the plurality of planet gears, where the bottom ring gear mates with one of the plurality of planet gears, and where the sun gear mates with one of the plurality of moon gears, where at least one of the plurality of moon gears mates with at least one of the plurality of planet gears where the caster comprises a caster wheel and a caster bracket, where the caster bracket is secured to the sun gear, where the toothed portion of the top hanger mates with the top ring gear, where the toothed portion of the bottom hanger mates with the bottom ring gear, and whereby angular displacement of the top hanger about the king pin causes a displacement of the caster and angular displacement of the bottom hanger about the king pin causes a displacement of the caster from the centerline of skateboard.

There has thus been outlined, rather broadly, the more important features of the invention in order that the detailed description thereof may be better understood, and in order that the present contribution to the art may be better appreciated. There are additional features of the invention that will be described hereinafter and which will form the subject matter of the claims appended hereto. The features listed herein and other features, aspects and advantages of the present invention will become better understood with reference to the following description and appended claims.

BRIEF DESCRIPTION OF THE FIGURES

The accompanying drawings, which are incorporated in and form a part of this specification, illustrate embodiments of the invention and together with the description, serve to explain the principles of this invention.

FIG. 4 is a front view of a skateboard according to selected embodiments of the current disclosure.

FIG. 5 is bottom perspective view of a skateboard truck according to selected embodiments of the current disclosure.

FIG. 6 is a cut-away view of the gearing assembly of a skateboard truck according to selected embodiments of the current disclosure.

FIG. 11 is a front perspective view of a skateboard with the downhill wheel raised according to selected embodiments of the current disclosure.

FIG. 12 is a bottom perspective view of a skateboard truck showing displacement and rotation of the castor from the centerline according to selected embodiments of the current disclosure.

FIG. 13 is a cut-away view of the gearing assembly of a skateboard truck showing the displacement of the rivet relative to the centerline according to selected embodiments of the current disclosure.

FIG. 14 is a front perspective view of a skateboard with the downhill wheel raised and the castor wheel rotated perpendicular to the centerline of the skateboard according to selected embodiments of the current disclosure.

FIG. 15 is a bottom perspective view of a skateboard truck showing displacement and approximately ninety-degree rotation of the castor from the centerline according to selected embodiments of the current disclosure.

FIG. 16 is a cut-away view of the gearing assembly of a skateboard truck showing the displacement of the rivet relative to the centerline according to selected embodiments of the current disclosure.

DETAILED DESCRIPTION OF THE INVENTION

Figure 1:
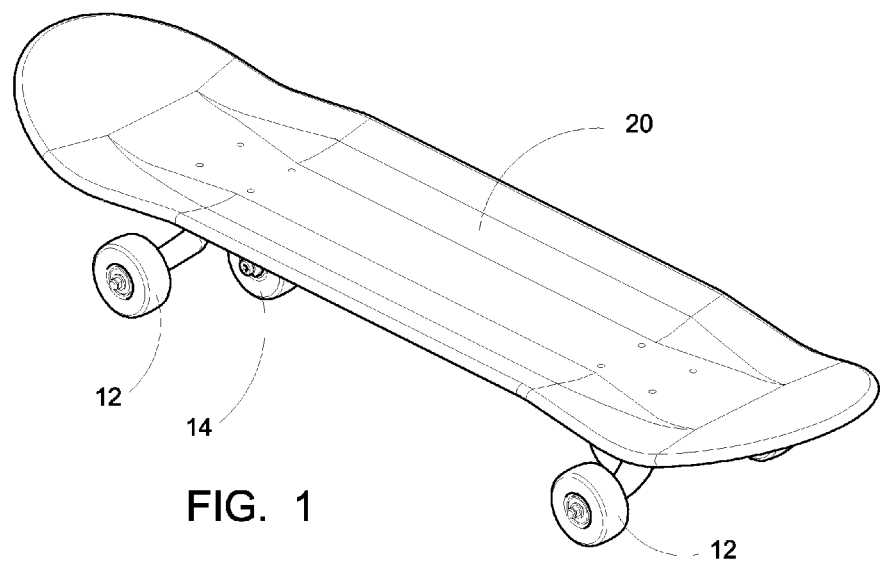
FIG. 1 is a top perspective view of a skateboard according to selected embodiments of the current disclosure.

Many aspects of the invention can be better understood with the references made to the drawings below. The components in the drawings are not necessarily drawn to scale. Instead, emphasis is placed upon clearly illustrating the components of the present invention. Moreover, like reference numerals designate corresponding parts through the several views in the drawings.

One embodiment of the current invention is a skateboard truck assembly that has some combination of wheels and casters resulting in at least three round items capable of moving (in combination with at least one other skateboard truck) a skateboard across the ground. There are two skateboard wheels suspended on hangers or axles, with one caster, which sits in a caster bracket. A goal behind the invention is to provide a skateboarder with an improved "sliding" or "drifting" ability, along with increased stability, improved maneuverability, and a lighter weight.

In a particular embodiment, the skateboard truck includes a set of independent hangers with integrated gears that mate with a modified planetary gearing system. Modified planetary gearing system links each hanger with the displacement of the caster. Such a gearing system allows both wheels and a caster to remain on the ground when in a neutral state as well as to raise one of the two wheels while leaving the other wheel and castor in contact with the ground when in a modified state. A modified state occurs when a rider places an unequal force about the centerline of the skateboard, such as when the rider leans on one side of the skateboard.

With two such skateboard trucks on each end of a skateboard, the rider can have a total of six wheels on the ground simultaneously while skateboarding. When the rider leans a sufficient amount to displace the center wheel, or caster, from the centerline of the skateboard, the rider will have a total of four wheels on the ground and the configuration of the skateboard truck forces the "downhill" wheels away from the ground and far enough in the air to avoid catching on street irregularities.

The function of the skateboard truck proceeds as follows. When the skateboard is in a neutral state, the caster wheels support a majority, if not all, of the weight of the rider. Each hanger is approximately the same distance from the deck of the skateboard. The caster wheel rotates in the same direction as the wheels secured to the hangers.

As the rider of the skateboard leans on one side of the skateboard, the wheel on that side is displaced towards the deck of the skateboard. This movement is transferred to the hanger, which rotates about the kingpin. A toothed portion, or bevel gear, on the hanger then rotates a ring gear, which in turn rotates a planet gear and corresponding moon gears, which then rotate the sun gear. The rotation of the sun gear is linked to the caster thereby causing the caster wheel to be displaced about the same axis as the sun gear. The caster wheel is free to function as any normal caster wheel, wherein it may rotate to match the appropriate direction of travel. The opposite hanger (the one not displaced towards the deck of the skateboard) does not move relative to the skateboard deck, but does move away from the ground. Ring stops, discussed in more detail below, prevent each hanger from rotating below its neutral state (away from the deck of the skateboard) or more than a defined angle above its neutral state (towards the deck of the skateboard).

Since each hanger is independent of the other and not molded from the same piece of metal as are traditional hangers, both wheels and the caster can remain on the ground simultaneously when the user is travelling along a path that is substantially parallel to the centerline of the skateboard. Furthermore, as the rider applies pressure on one side of the board and angles the deck, the wheels on the opposite edge of the board lift off of the ground. Should the rider continue to put pressure on one side of the board, the base of the caster will displace from the centerline of the skateboard, where the caster is free to rotate in the direction of the rider's choosing. However, the castor does not offset given any torque applied directly to the sun gear, such as when a lateral force is applied directly to the caster wheel in a direct attempt to offset the caster from the centerline of the skateboard. This is achieved through the geometry of the gearing system, particularly through the moon and planet gears.

It should be noted that there are two important axes of rotation. One axis is the axis that is shared by the bracket for the caster wheel and the sun gear. It is assembled with thrust bearings, washers, and a rivet. The caster wheel is free to rotate about this axis. The second important axis is the axis shared by the sun gear, both ring gears or annulus, and the baseplate. It is assembled with a rivet. As the baseplate remains stationary, the rotation of a ring gear and the sun gear (or cover) is governed by one of the hangers. The rotation of the other ring gear and again, the cover, is governed by the other hanger. This short summary of the invention will be further explained below.

It is important to note that the hanger gear is shown in these illustrations with teeth that engage teeth in the ring gear, but it is contemplated that gearing other than through the use of teeth is possible.

FIG. 1 is a top perspective view of a skateboard according to selected embodiments of the current disclosure. The skateboard includes a skateboard deck 20 with two skateboard trucks attached thereto, better viewed in FIG. 2. Each skateboard truck includes two wheels 12 and a castor wheel 14.

Figure 2:
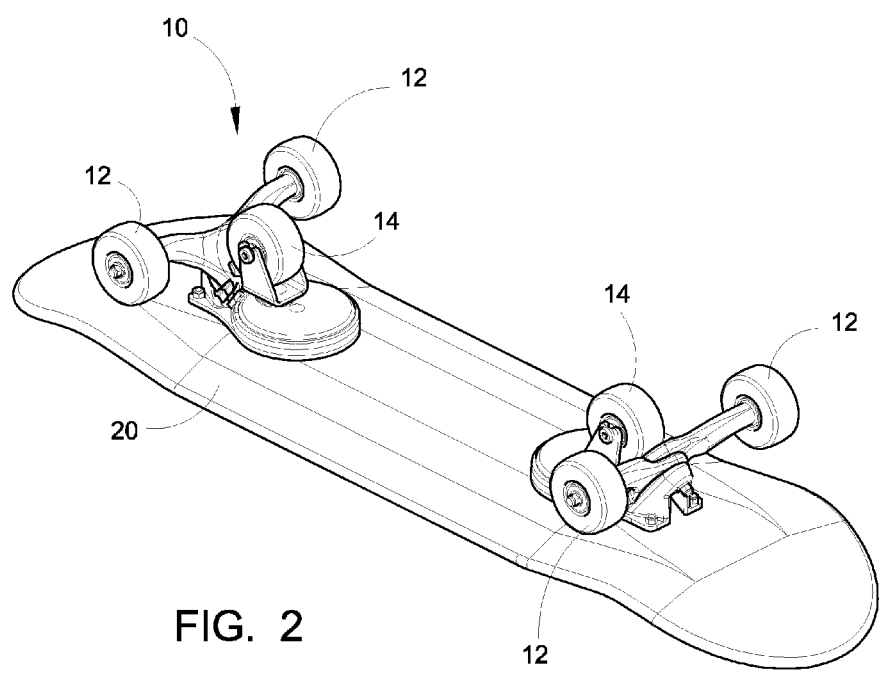
FIG. 2 is a bottom perspective view of a skateboard according to selected embodiments of the current disclosure.

FIG. 2 is a bottom perspective view of a skateboard according to selected embodiments of the current disclosure. Each skateboard truck 10 is secured to one end of the skateboard deck 20, usually by means of screws. As stated above, each skateboard truck 10 includes two wheels 12 and a castor wheel 14.

Figure 3:
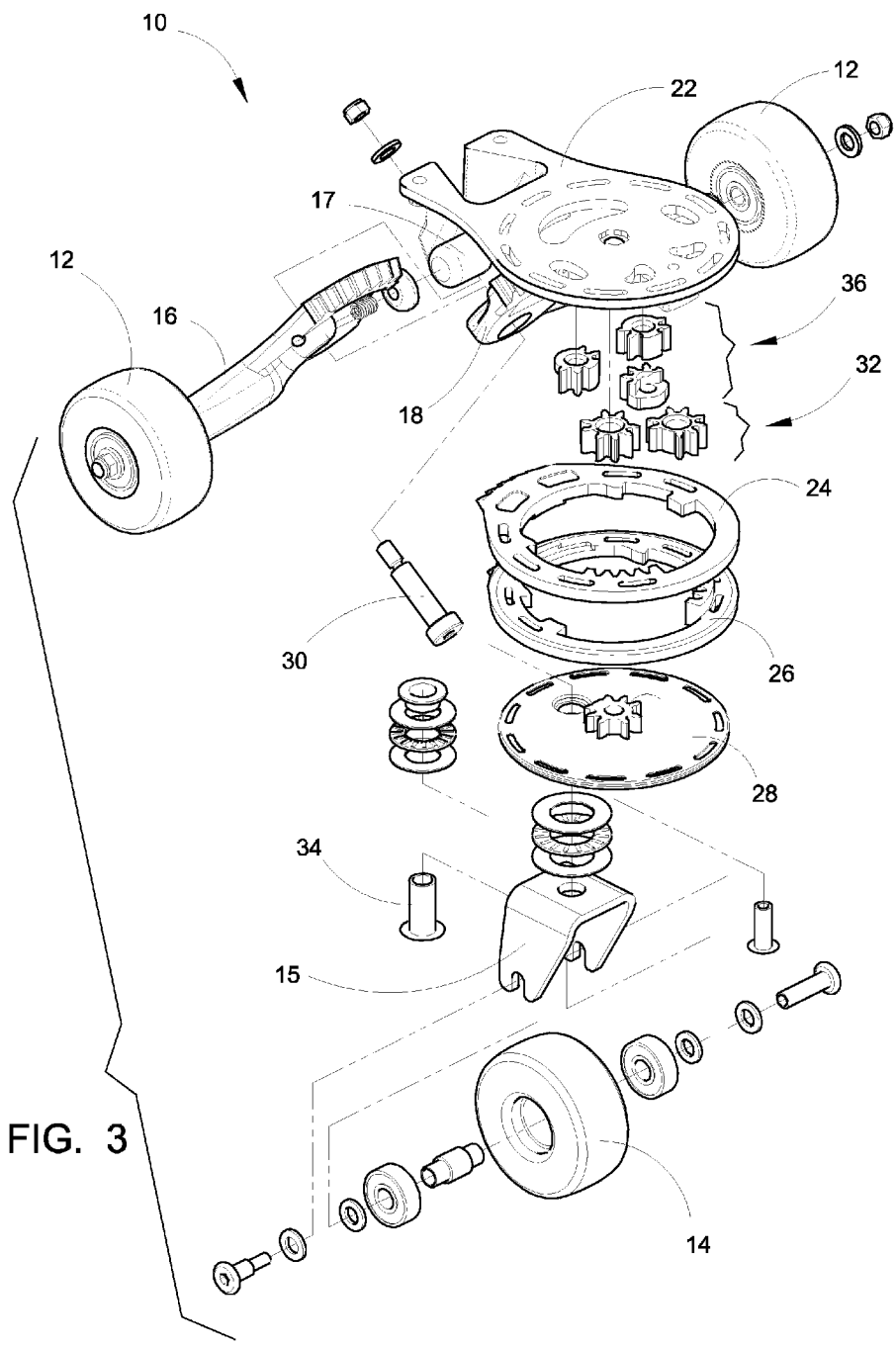
FIG. 3 is an exploded perspective view of a skateboard truck according to selected embodiments of the current disclosure.

FIG. 3 is an exploded perspective view of a skateboard truck according to selected embodiments of the current disclosure. The skateboard truck 10 includes a baseplate 22 that is used to secure the skateboard truck to the skateboard deck. A bottom hanger 16 and a top hanger 18 are secured to the baseplate 22 by means of a kingpin 30. The bottom hanger 16 and the top hanger 18 each have a wheel 12 secured thereto.

The bottom hanger 16 and top hanger 18 are allowed to move relative to each other. However, there is a spring 17 (or a compressible and resilient bushing) located therebetween that applies a force to each of the hangers that, if left unrestrained, would push the wheels 12 away from the deck of a skateboard. Ring stops, discussed in more detail below, prevent the hangers from rotating down from their neutral state. Each hanger also has a tooth portion (shown in more detail in FIG. 7) that engages a ring gear (annulus), wherein the top hanger 18 mates with the top ring gear 26 and the bottom hanger 16 mates with the bottom ring gear 24. The ring gears are secured between the base plate 22 and a sun gear 28. A plurality of planet gears 32 and moon gears 36 are also situated between the base plate 22 and the sun gear 28 as well as within the ring gears.

A caster wheel 14 is secured to a caster bracket, which in turn is secured to the sun gear 28. The rivet 34 is used to secure a caster bracket 15 to the sun gear 28, with thrust bearings and washers in between. This configuration allows for the caster wheel 14 to rotate freely about an axis along the length of the rivet 34 while at the same time rotating about the axis of the sun gear 28.

FIG. 4 is a front view of a skateboard according to selected embodiments of the current disclosure. In this view, the skateboard is in a neutral configuration, as if the rider were travelling along a straight line that extends down a lengthwise axis (centerline) of the skateboard. All three wheels, including wheels 12 and castor wheel 14 are in contact with the ground 40 and pointed in the same direction. Top hanger 18 and bottom hanger 16 are in a neutral position, where each is approximately the same distance from the skateboard deck 20.

FIG. 5 is bottom perspective view of a skateboard truck according to selected embodiments of the current disclosure. When a rider applies a force to one side of the skateboard and not the other, the skateboard deck 20 moves closer to the wheel on the side on which the force is applied. In this figure, the arrows show a direction of movement of the wheel when such a force is applied.

FIG. 6 is a cut-away view of the gearing assembly of a skateboard truck according to selected embodiments of the current disclosure. This figure includes an arrow showing the rotational movement of the top hanger 18 and top ring gear 26 when the wheel of the top hanger 18 rotates as shown in FIG. 5. Top hanger 18 has a toothed portion, or bevel gear, that engages top ring gear 26, which in turn engages planet gear 32A. Furthermore, planet gear 32 engages moon gears 36A and 36B. Next, moon gears 36A and 36B engage sun gear 28. Therefore, the caster, which is secured to the sun gear by rivet 34, is indirectly connected by means of multiple gears to the top hanger 18.

Figure 7:
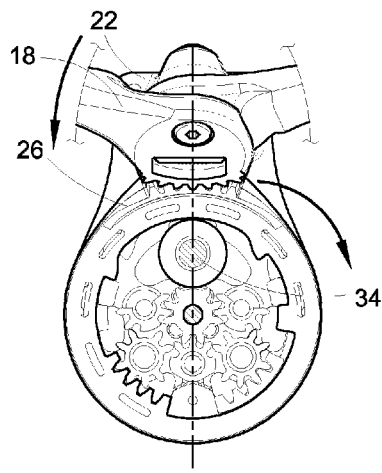
FIG. 7 is a cut-away view of the gearing assembly of a skateboard truck showing directions of rotation of a top ring gear and a top hanger according to selected embodiments of the current disclosure.

FIG. 7 is a cut-away view of the gearing assembly of a skateboard truck showing directions of rotation of a top ring gear and a top hanger according to selected embodiments of the current disclosure. As top hanger 18 rotates in a counter-clockwise direction, top ring gear 26 rotates in a clockwise direction.

Figure 8:
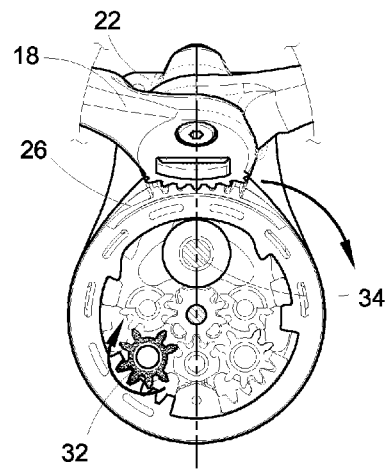
FIG. 8 is a cut-away view of the gearing assembly of a skateboard truck showing directions of rotation of a top ring gear and a planet gear according to selected embodiments of the current disclosure.

FIG. 8 is a cut-away view of the gearing assembly of a skateboard truck showing directions of rotation of a top ring gear and a planet gear according to selected embodiments of the current disclosure. As top ring gear 34 rotates in a clockwise direction, planet gear 32 rotates in a clockwise direction.

Figure 9:
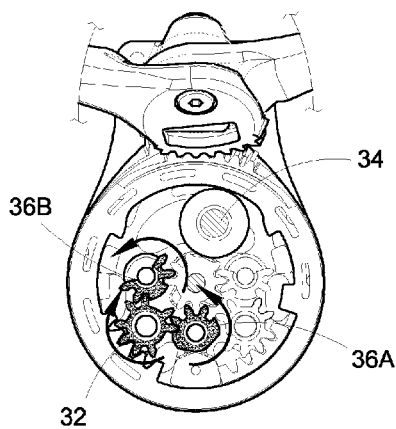
FIG. 9 is a cut-away view of the gearing assembly of a skateboard truck showing a rotated planet gear and corresponding moon gears according to selected embodiments of the current disclosure.

FIG. 9 is a cut-away view of the gearing assembly of a skateboard truck showing a rotated planet gear and corresponding moon gears according to selected embodiments of the current disclosure. As planet gear 32 rotates in a clockwise direction, moon gears 36A and 36B rotate in a counter-clockwise direction.

Figure 10:
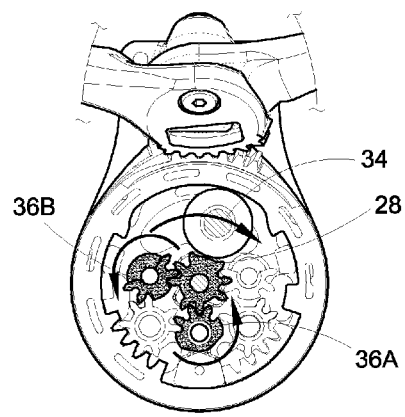
FIG. 10 is a cut-away view of the gearing assembly of a skateboard truck showing rotated moon gears and rotational movement of a rivet according to selected embodiments of the current disclosure.

FIG. 10 is a cut-away view of the gearing assembly of a skateboard truck showing rotated moon gears and rotational movement of a rivet according to selected embodiments of the current disclosure. As moon gears 36A and 36B rotate in a counter-clockwise direction, sun gear 28 rotates in a clockwise direction. Since the caster wheel, via the caster bracket and rivet 34, is connected to the sun gear 28, it moves in a similar direction. Thus, when top ring gear 26 rotates in a clockwise direction, so does the caster.

It must be appreciated that the same events occur with the bottom hanger as they do with the top hanger, but in reverse. Thus, when the bottom ring gear rotates counter-clockwise, so does the caster. However, while each hanger may cause the caster to move in a particular direction, the gearing is such that the movement of one hanger does not necessitate the movement of the other hanger, as doing so would attempt to force the caster in opposing directions.

FIG. 11 is a front perspective view of a skateboard in a turn with the downhill wheel raised according to selected embodiments of the current disclosure. A force is applied to the skateboard deck 20 to cause the top hanger 18 and the wheel 12 secured thereto to move towards the skateboard deck. Doing so causes the caster wheel 14 to move away from the side of the skateboard with the top hanger 18. This movement, combined with the angling of the skateboard deck 20 causes the other hanger, the bottom hanger 16 and the wheel 12 secured thereto, to move away from the ground such that the wheel lifts off of the ground.

FIG. 12 is a bottom perspective view of a skateboard truck showing displacement and rotation of the castor from the centerline according to selected embodiments of the current disclosure. The caster wheel 14 has moved a distance $\Delta D$ away from top hanger 18 and towards bottom hanger 16 because of the rotation of caster bracket 15 with sun gear 28.

FIG. 13 is a cut-away view of the gearing assembly of a skateboard truck showing the displacement of the rivet relative to the centerline according to selected embodiments of the current disclosure. The rivet 34, to which the caster wheel is connected via the caster bracket (both not shown in this figure), rotates with the sun gear 28. The sun gear 28 is rotated due to the movement of top hanger 18. The rivet 34 is displaced a distance ΔD relative to its neutral state.

FIG. 14 is a front perspective view of a skateboard with the downhill wheel raised and the castor wheel rotated perpendicular to the centerline of the skateboard according to selected embodiments of the current disclosure. Similar to FIG. 11, this figure shows the bottom hanger 16 and the wheel 12 secured thereto displaced away from the ground such that the wheel lifts off of the ground, while the top hanger 18 and the wheel secured thereto remain in contact with the ground. This configuration is used when the skateboard moves laterally.

FIG. 15 is a bottom perspective view of a skateboard truck showing displacement and approximately ninety-degree rotation of the castor from the centerline according to selected embodiments of the current disclosure. The caster wheel 14 is shown displaced a distance ΔD from the centerline of the skateboard truck. Sun gear 28 has been rotated according to directional arrows located thereon by the angular displacement of top hanger 18. The caster wheel is also rotated perpendicular to the centerline of the skateboard. This enables a rider to more easily ride a skateboard in a perpendicular direction to the centerline of the skateboard.

FIG. 16 is a cut-away view of the gearing assembly of a skateboard truck showing the displacement of the rivet relative to the centerline according to selected embodiments of the current disclosure. Rivet 34, to which the caster wheel is connected via the caster bracket (both not shown in this figure), is displaced a distance ΔD from the centerline of the skateboard truck (and thus skateboard). Top hanger 18 rotates top ring gear 26, which in turn causes planet gears 32 and sun gear 28 to rotate according to directional arrows located thereon. Rivet 34, being secured to sun gear 28, is therefore displaced a distance ΔD.

Figures 17, 18:
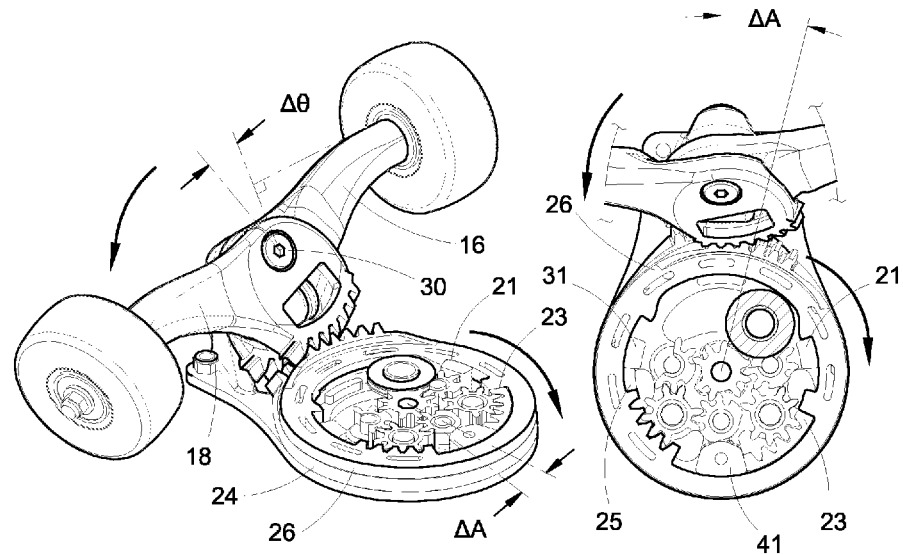
FIG. 17 is a bottom perspective view of a skateboard truck with the sun gear partially removed and an angular displacement of the top hanger and top ring gear.
FIG. 18 is a cut-away view of the gearing assembly of a skateboard truck showing the angular displacement present in FIG. 17.

FIG. 17 is a bottom perspective view of a skateboard truck with the sun gear partially removed and an angular displacement of the top hanger and top ring gear. Top hanger 18 is displaced an angle Δθ about kingpin 30. At the same time, bottom hanger 16 remains in its neutral state. Rotation of top hanger 18 causes top ring gear 26 to rotate an angle ΔA. In a particular embodiment, the maximum angle of rotation ΔA of top ring gear 26 is sixteen degrees. Further rotation of the top ring gear 26 is resisted by top ring stops 21, 23, and 25 (ring stop 25 is more clearly shown in FIG. 18). Ring stop 21 is a protrusion that is incorporated into baseplate 22. Ring stops 23 and 25 are an internal gear and protrusion, respectively, that are incorporated into bottom ring gear 24. Corresponding protrusions in top ring gear 26 mate with the ring stops 21, 23, and 25 when it has reached its maximum rotational angle, whereby further rotation is resisted.

FIG. 18 is a cut-away view of the gearing assembly of a skateboard truck showing the angular displacement present in FIG. 17. Ring stops 21, 23, and 25 are used to prevent top ring gear 26 from rotating beyond a desired angle, in this embodiment sixteen degrees. As top ring gear 26 rotates, a portion of top ring gear 26 will eventually come in contact with ring stops 21, 23, and 25, which then prevents further rotation. At the same time, downward rotation of the opposing bottom hanger 16 is resisted by the rotational limits of bottom ring gear 24, whose further rotation is prevented by ring stops 21, 31, and 41. This causes the bottom hanger 16 to remain in its neutral state relative to the skateboard deck and rise off of the ground when the user leans to the top hanger 18 side.

Figures 19, 20:
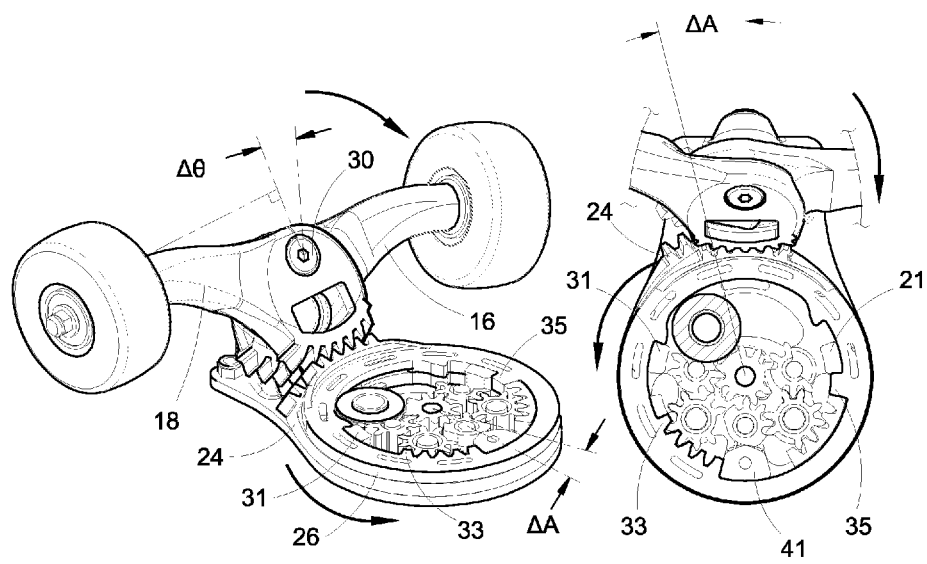
FIG. 19 is a bottom perspective view of a skateboard truck with the sun gear partially removed and an angular displacement of the bottom hanger and bottom ring gear.
FIG. 20 is a cut-away view of the gearing assembly of a skateboard truck showing the angular displacement present in FIG. 19.

FIG. 19 is a bottom perspective view of a skateboard truck with the sun gear partially removed and an angular displacement of the bottom hanger and bottom ring gear. Bottom hanger 16 is displaced an angle Δθ about kingpin 30. At the same time, top hanger 18 remains in its neutral state. Rotation of bottom hanger 16 causes bottom ring gear 24 to rotate an angle ΔA. In a particular embodiment, the maximum angle of rotation ΔA of bottom ring gear 24 is sixteen degrees. Further rotation of the bottom ring gear 24 is resisted by bottom ring stops 31, 33, and 35. Ring stop 31 is a protrusion that is incorporated into baseplate 22. Ring stops 33 and 35 are an internal gear and protrusion, respectively, that are incorporated into the top ring gear 26. Corresponding protrusions in bottom ring gear 24 mate with the ring stops 31, 33, and 35 when it has reached its maximum rotational angle, whereby further rotation is resisted.

FIG. 20 is a cut-away view of the gearing assembly of a skateboard truck showing the angular displacement present in FIG. 19. Ring stops 31, 33, and 35 are used to prevent bottom ring gear 24 from rotating beyond a desired angle, in this embodiment sixteen degrees. As bottom ring gear 24 rotates, a portion of bottom ring gear 24 will eventually come in contact with ring stops 31, 33, and 35, which then prevents further rotation. At the same time, downward rotation of the opposing top hanger 18 is resisted by the rotational limitations of the top ring gear 26, whose further rotation is prevented by ring stops 21, 31, and 41. This causes the top hanger 18 to rise off of the ground when the user leans to the bottom hanger 16 side.

Various different materials can be used for the gears, hangers, wheels, and other various components of the skateboard truck. For example, the gears may be manufactured from stainless steel, titanium, or aluminum. In a particular embodiment, the wheels are made from polyurethane.

Other gear configurations may be implemented as well to achieve the same desired outcomes of the current invention. More or fewer gears may be used so long as each hanger displaces the caster wheel from the centerline of the skateboard. In fact, mechanisms other than gearing may be used to achieve the same outcome. For example, a pulley system may be used wherein angular displacement of the hanger moves the caster wheel through a series of pulleys. Alternatively, angular displacement of the hangers may be read in by an electronic sensor, which in turn causes an electric motor to displace the caster wheel from the centerline of the skateboard.

It should be understood that while the preferred embodiments of the invention are described in some detail herein, the present disclosure is made by way of example only and that variations and changes thereto are possible without departing from the subject matter coming within the scope of the following claims, and a reasonable equivalency thereof, which claims I regard as my invention.

All of the material in this patent document is subject to copyright protection under the copyright laws of the United States and other countries. The copyright owner has no objection to the facsimile reproduction by anyone of the patent document or the patent disclosure, as it appears in official governmental records but, otherwise, all other copyright rights whatsoever are reserved.

That which is claimed:

1. A skateboard truck comprising
a hanger system, a caster, and a gearing system,
where the hanger system comprises a top hanger, a bottom hanger, a king pin, and two wheels, where the top hanger and bottom hanger rotate about the king pin, where the top hanger and bottom hanger each comprise a toothed portion, where one wheel is secured to the top hanger, where one wheel is secured to the bottom hanger, where the gearing system comprises a top ring gear, a bottom ring gear, a sun gear, a plurality of planet gears, and a plurality of moon gears, where the top ring gear mates with one of the plurality of planet gears, where the bottom ring gear mates with one of the plurality of planet gears, where the planet gears mate with one of the plurality of moon gears, and where the sun ring mates with one of the plurality of moon gears, where the caster comprises a caster wheel and a caster bracket, where the caster bracket is secured to the sun gear, where the toothed portion of the top hanger mates with the top ring gear, where the toothed portion of the bottom hanger mates with the bottom ring gear, and whereby angular displacement of the top hanger about the king pin causes a displacement of the caster and angular displacement of the bottom hanger about the king pin causes a displacement of the caster.

2. The skateboard truck of claim 1, wherein the gearing system further comprises a plurality of ring stops, where the ring stops resist rotation of the top ring gear and bottom ring gear beyond a specified angle, where the ring stops are integrated into the baseplate, top ring gear, bottom ring gear, or any combination thereof.

3. The skateboard truck of claim 1, wherein the hanger system further comprises a spring, where the spring is located between the top hanger and bottom hanger, where the spring applies a force to the top hanger and bottom hanger.

4. The skateboard truck of claim 1, wherein the caster bracket of the caster is secured to the sun gear by means of a rivet.

5. A skateboard truck comprising
a hanger system, a caster, and a gearing system,
where the hanger system comprises a top hanger, a bottom hanger, and a king pin, where the top hanger and bottom hanger rotate about the king pin,
where the gearing system comprises a plurality of gears,
where the caster comprises a caster wheel and a caster bracket,
where the hanger system is in mechanical connection with the caster through the gearing system,
whereby angular displacement of the top hanger about the king pin causes a displacement of the caster and angular displacement of the bottom hanger about the king pin causes a displacement of the caster.

6. The skateboard truck of claim 5, wherein the hanger system further comprises two wheels, where one wheel is secured to the top hanger, and where one wheel is secured to the bottom hanger.

7. The skateboard truck of claim 5, wherein the plurality of gears comprises a top ring gear, a bottom ring gear, a sun gear.

8. The skateboard truck of claim 7, wherein the plurality of gears further comprises a plurality of planet gears and a plurality of moon gears.

9. The skateboard truck of claim 8, wherein the top ring gear mates with one of the plurality of planet gears, where the bottom ring gear mates with one of the plurality of planet gears, where the planet gears mate with one of the plurality of moon gears, and where the sun ring mates with one of the plurality of moon gears.

10. The skateboard truck of claim 5, where the top hanger and bottom hanger each comprise a toothed portion.

11. The skateboard truck of claim 10, wherein the caster bracket is secured to the sun gear, where the toothed portion of the top hanger mates with the top ring gear, where the toothed portion of the bottom hanger mates with the bottom ring gear.

12. The skateboard truck of claim 11, wherein the gearing system further comprises a plurality of ring stops, where the ring stops resist rotation of the top ring gear and bottom ring gear beyond a specified angle, where the ring stops are integrated into the baseplate, top ring gear, bottom ring gear, or any combination thereof.

13. The skateboard truck of claim 10, wherein the caster bracket of the caster is secured to the sun gear by a rivet.

14. The skateboard truck of claim 5, wherein the hanger system further comprises a spring, where the spring is located between the top hanger and bottom hanger, where the spring applies a force to the top hanger and bottom hanger.

15. A skateboard comprising
two skateboard trucks, where each skateboard truck comprises a hanger system, a caster, and a gearing system, where the skateboard has a centerline that runs down its length,
where the hanger system comprises a top hanger, a bottom hanger, a king pin, and two wheels, where the top hanger and bottom hanger rotate about the king pin, where one wheel is secured to the top hanger, where one wheel is secured to the bottom hanger,
where the gearing system comprises a plurality of gears,
where the caster comprises a caster wheel and a caster bracket,
where the caster bracket, top hanger, and bottom hanger are each secured to one of the plurality of gears of the gearing system, and
whereby angular displacement of the top hanger about the king pin causes a displacement of the caster and angular displacement of the bottom hanger about the king pin causes a displacement of the caster from the centerline of skateboard.

16. The skateboard of claim 15, wherein the gearing system of each skateboard truck comprises a top ring gear, a bottom ring gear, a sun gear, a plurality of planet gears, and a plurality of moon gears where the top ring gear mates with one of the plurality of planet gears, where the bottom ring gear mates with one of the plurality of planet gears, where the planet gears mate with one of the plurality of moon gears, and where the sun ring mates with one of the plurality of moon gears.

17. The skateboard of claim 16, wherein the top hanger and bottom hanger of the hanger system each comprise a toothed portion, where the toothed portion of the top hanger mates with the top ring gear, where the toothed portion of the bottom hanger mates with the bottom ring gear.

18. The skateboard of claim 16, wherein the gearing system further comprises two ring stops, wherein the ring stops resist rotation of the top ring gear and bottom ring gear beyond a specified angle.

19. The skateboard of claim 16, wherein the caster bracket of the caster is secured to the sun gear by a rivet.

20. The skateboard of claim 15, wherein the hanger system further comprises a spring, where the spring is located between the top hanger and bottom hanger, where the spring applies a force to the top hanger and bottom hanger.

21. The skateboard of claim 15, wherein the skateboard further comprises six wheels and has a neutral state, wherein a wheel is attached to each hanger of each truck, and where a wheel is attached to each caster of each truck, where each wheel of the skateboard is in contact with a surface that the skateboard rests upon when in a neutral state.

22. The skateboard of claim 15, whereby the castor of a truck is not offset when a lateral force is applied directly to the caster wheel.

* * * * *